UNITED STATES PATENT OFFICE.

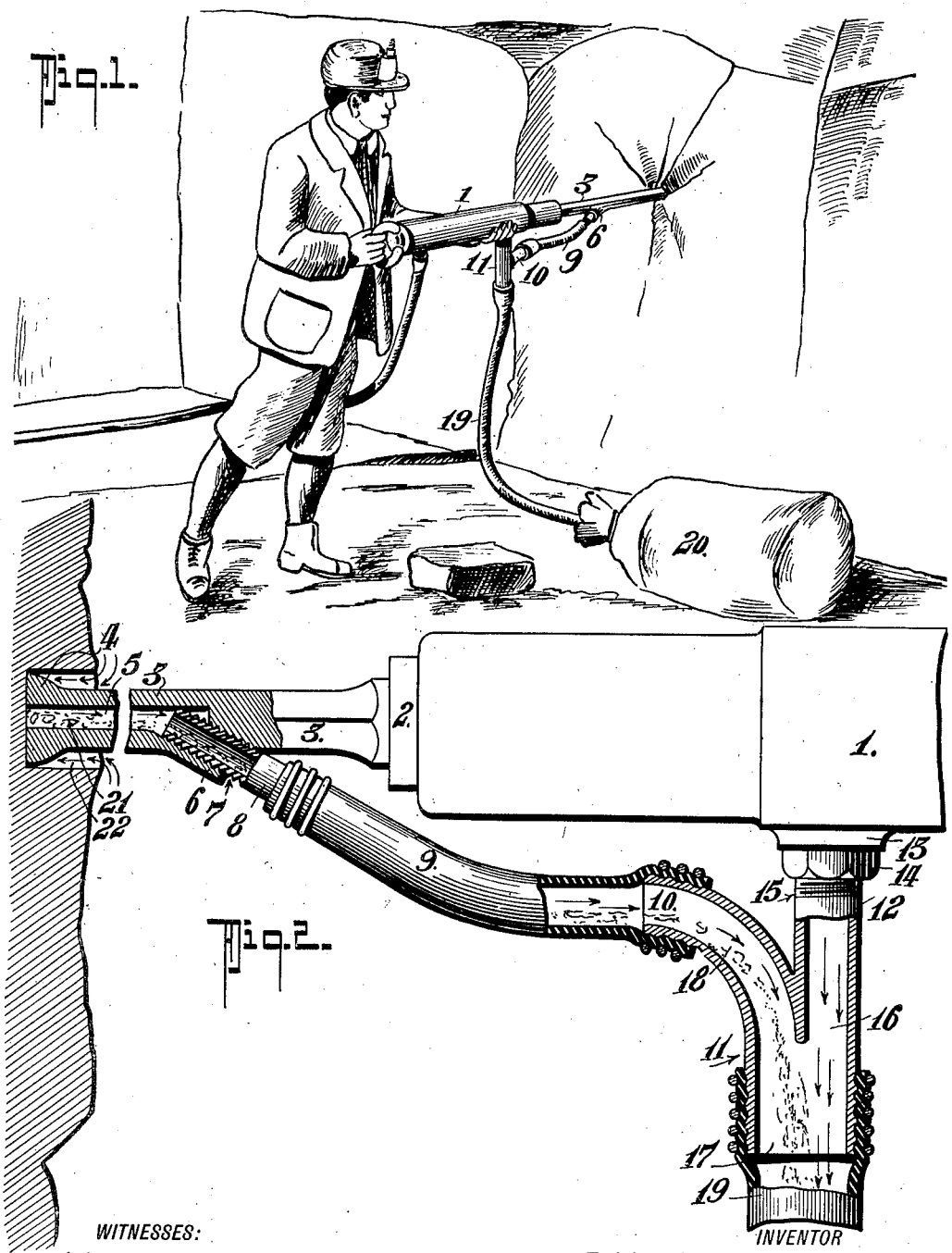

VILHELM PHILIP KESSEL, OF SAN FRANCISCO, CALIFORNIA, ASSIGNOR, BY MESNE ASSIGNMENTS, TO SAID VILHELM PHILIP KESSEL AND A. JORGENSEN, OF SAN FRANCISCO, CALIFORNIA.

DUST-REMOVER FOR ROCK-DRILLS.

1,084,152.  Specification of Letters Patent.  Patented Jan. 13, 1914.

Application filed March 12, 1913. Serial No. 753,785.

*To all whom it may concern:*

Be it known that I, VILHELM P. KESSEL, residing at San Francisco, in the county of San Francisco and State of California, have invented certain new and useful Improvements in a Dust-Remover for Rock-Drills, of which the following is a specification.

In the art of rock drilling, drilling engines of the reciprocating hammer piston type, operated by compressed air, are often employed. In this type of apparatus, the drill is held in a suitable chuck, and receives, either directly, or indirectly through a tappet, the impact of the hammer piston. In some instances, the drill is hollow or it has a bore through which water, compressed air or the exhaust from the engine is passed to wash or blow out the cuttings from the hole. In those cases where the air is used to blow out the cuttings, the dust becomes very offensive and injurious to the operator, since it is blown back directly toward him.

It is therefore a further object of my invention to provide means whereby the exhaust of the engine may be employed in coöperation with a drill having a bore leading to its end whereby to suck the cuttings into the drill bore and pass them out through a pipe to a delivery place where they may be deposited into a receptacle of some suitable sort.

A further object of the invention is to provide such an apparatus which is simple, inexpensive to manufacture and readily applicable to the ordinary types of drilling engines and drills now in use.

In its general nature the invention resides in providing an ejector device which is screwed or otherwise fastened to the drilling engine at the exhaust port and is coupled to the drill rod or steel to communicate with the upper end of the bore or passage that extends through the drill to the drilling end of the same. The ejector is also connected at its discharge side with a hose through which the ejected products are conveyed to a suitable receiver, the arrangement being such that the exhaust from the drilling engine will suck the dust and chips or other cuttings from the hole directly through the drill bore and pass them out through the offtake hose to the receiver, thus eliminating entirely the dust in the atmosphere surrounding the drill and keeping the hole clean.

In its more detailed nature, the invention includes those novel details of construction, combination and arrangement of parts, all of which will be first fully described, and then be specifically pointed out in the appended claims, and illustrated in the accompanying drawing, in which:

Figure 1 is a perspective view illustrating the invention in use. Fig. 2 is an enlarged side elevation, parts being broken away, showing the invention and the manner of attaching it to the drilling engine and drill.

In the drawing, 1 is the drilling engine which is of the usual type and which has the usual drill receiving chuck 2 in which the drill steel 3 is held. The drill 3 has a drilling or cutting end 4 and a central bore 5, that terminates short of the chuck end of the drill 3, and where the bore 5 terminates, the drill is bossed, as at 6, and tapped, as at 7, to receive a tubular nipple 8 to which a short section of hose 9 is connected, the hose 9 being also connected to the intake end 10 of the ejector 11.

12 is the end of the ejector which is adapted to connect with the exhaust duct 13 of the drill 1, the end 12 being provided with a nut portion 14 and a threaded end 15 that is tapped into the exhaust port or duct 13 whereby the exhaust from the engine will pass through the channel 16 of the ejector 11 toward the discharge end 17 of the same. The channel 18 also discharges into the discharge end 17 of the ejector, and an offtake hose 19 is connected over such end 17 and delivers the refuse into a suitable bag or other receptacle 20.

In operation, the exhaust from the engine, passing through the channel 16 in the direction of the arrows, causes a suction to occur in the channel 18 which, of course, is communicated, through the hose 9, with the bore 5 of the drill 3 and thus sucks the cuttings 21 from the hole 22. Air rushing into the hole 22 around the outside of the drill, as indicated by the arrows, and passing into the bore 5, draws the dust, chips and cuttings from the hole through the bore 5 and hose 9 and ejector channel 18 into the discharge end 17 of the same, where the action of the exhaust gases, passing through the hose 19, impels the cuttings to the bag or receptacle 20, it being understood that the receptacle 20 is preferably made of porous material through which air but not the cuttings may pass off to atmosphere.

From the foregoing description, taken in connection with the accompanying drawing, it is believed the complete construction, operation and advantages of my invention will be readily apparent to those skilled in the art.

What I claim is:

1. In combination with a drilling engine, a drill carried by the same, said drill having a bore extending from the cutting end longitudinally of the drill toward the chuck end and terminating short of the chuck end, said drill having an enlargement with a bore connecting said longitudinal bore with the exterior of the drill, combined with an ejector secured to the exhaust duct of the engine and a connection between the suction passage of the ejector and the drill bore whereby the exhaust from the engine passing through the ejector will suck the cuttings through the bore of the drill and eject the same.

2. In combination with a drilling engine having an exhaust duct and a drill having a longitudinal bore opening at the cutting end of the drill, said drill having a boss located at the upper end of the bore and having a passage communicating with said bore, of a nipple tapped into said boss, an ejector having its entrant end tapped into the exhaust duct of said engine, said ejector including a suction duct, a pipe connection between said nipple and said suction duct, and an offtake hose connected with the discharge end of said ejector, all being arranged that the exhaust of the engine will cause a suction in the bore of the drill to suck the cuttings through the drill bore from the hole and deliver them to a discharge place via the connection between said nipple and via said ejector and said offtake hose to the final delivery point.

VILHELM PHILIP KESSEL.

Witnesses:
    J. F. Bowes,
    A. Jorgensen.